(12) United States Patent
Salgado

(10) Patent No.: US 8,678,729 B2
(45) Date of Patent: Mar. 25, 2014

(54) FULLY GROUTED MINE ROOF BOLT WITH EXPANSION ANCHOR

(75) Inventor: Mauricio Antonio Hidalgo Salgado, Santiago (CL)

(73) Assignee: FCI Holdings Delaware, Inc., Wilmington, DE (US)

( * ) Notice: Subject to any disclaimer, the term of this patent is extended or adjusted under 35 U.S.C. 154(b) by 79 days.

(21) Appl. No.: 13/344,990

(22) Filed: Jan. 6, 2012

(65) Prior Publication Data
US 2012/0251262 A1 Oct. 4, 2012

(30) Foreign Application Priority Data

Jan. 7, 2011 (CL) ..................................... 042-2011

(51) Int. Cl.
*F16B 13/04* (2006.01)
(52) U.S. Cl.
USPC .......................................... 411/15; 405/259.5
(58) Field of Classification Search
None
See application file for complete search history.

(56) References Cited

U.S. PATENT DOCUMENTS

| | | | |
|---|---|---|---|
| 4,140,479 A * | 2/1979 | Sirch et al. ...................... 432/18 |
| 4,642,964 A * | 2/1987 | Kellison ........................... 52/699 |
| 4,655,644 A * | 4/1987 | Lane et al. ................. 405/259.5 |
| 5,544,980 A | 8/1996 | Seegmiller | |
| 5,636,945 A * | 6/1997 | Nes ............................ 405/259.1 |
| 5,791,823 A | 8/1998 | Blakley et al. | |
| 5,791,824 A | 8/1998 | Radtke | |
| 5,882,148 A | 3/1999 | Mraz | |
| 6,033,153 A | 3/2000 | Fergusson | |
| 6,474,910 B2 * | 11/2002 | Lay ............................ 405/259.4 |
| 6,802,674 B2 | 10/2004 | Peltonen et al. | |
| 7,037,046 B2 * | 5/2006 | Fergusson ................. 405/259.5 |
| 7,318,689 B2 | 1/2008 | Kanflod et al. | |
| 7,381,013 B1 * | 6/2008 | Rataj et al. ................. 405/259.5 |
| 7,465,128 B2 * | 12/2008 | Bruneau .................... 405/259.3 |
| 7,896,580 B2 | 3/2011 | Weaver et al. | |
| 7,967,532 B2 | 6/2011 | Schmidt et al. | |
| 8,061,935 B2 * | 11/2011 | Weaver et al. ............. 405/259.4 |
| 8,137,032 B2 * | 3/2012 | Grocholewski et al. ... 405/259.5 |
| 8,142,109 B2 | 3/2012 | Schmidt | |
| 2011/0033246 A1 | 2/2011 | Locotos | |
| 2012/0048009 A1 | 3/2012 | Åberg et al. | |
| 2012/0114426 A1 | 5/2012 | Kenny | |
| 2012/0155971 A1 | 6/2012 | Schmidt | |
| 2012/0177448 A1 | 7/2012 | Steyn et al. | |
| 2012/0219365 A1 | 8/2012 | Podesser et al. | |
| 2013/0004246 A1 | 1/2013 | Cawood et al. | |
| 2013/0011205 A1 | 1/2013 | Schmidt | |

* cited by examiner

*Primary Examiner* — Gary Estremsky
(74) *Attorney, Agent, or Firm* — The Webb Law Firm

(57) ABSTRACT

A reinforcement system characterized by being formed by a standard helical rod, an expansion head adapted to the thread of the rod, a conical element made of a plastic material, a tube or sheath made of corrugated plastic, a reinforcement plate, and a standard threaded reinforcement nut, according to the helical rod employed, in order to provide immediate mechanical anchoring and the option of subsequent mortar injection.

7 Claims, 2 Drawing Sheets

FULLY GROUTED MINE ROOF BOLT WITH EXPANSION ANCHOR

BACKGROUND OF THE INVENTION

1. Field of the Invention

In strata control tasks for both mining and civilian applications, it is necessary to have reinforcement systems that provide increasing reliability and better installation times, thus increasing safety and reducing the time involved in carrying out said tasks.

This invention refers to a reinforcement bolt with immediate mechanical anchoring and subsequent injection option.

2. Description of Related Art

There are various reinforcement techniques and elements currently employed in strata control. Of particular interest to this application are bolts and rods. Reinforcement systems may be classified in various ways. Among them according to the work load are passive anchors, active anchors and mixed anchors. According to their supporting mechanism adhesive anchors and friction anchors can be found. For adhesive anchors, the annular space between the bolt and the perforation is filled with resin or cement mortar, which upon curing, offers sufficient adhesiveness to cement the rod to the terrain. Friction anchors employ expansion heads and elements that expand and interact with rock at the moment that tension is applied to the anchor.

According to their shape, manufacture or operating principle: helical bolts, self-drilling bolts, smooth rods threaded at either end, grooved rods, and grooved rods threaded at either end, etc. are also found.

Helical bolts are resistant transversal section rods, oval-shaped, with projections shaped like a large-bore, left-handed thread. They are manufactured by means of hot rolling. A nut or threaded element can be placed on its thread, and it may roll lengthwise along the projections, thus generating the desired anchoring.

BRIEF DESCRIPTION OF THE INVENTION

Figure 1:
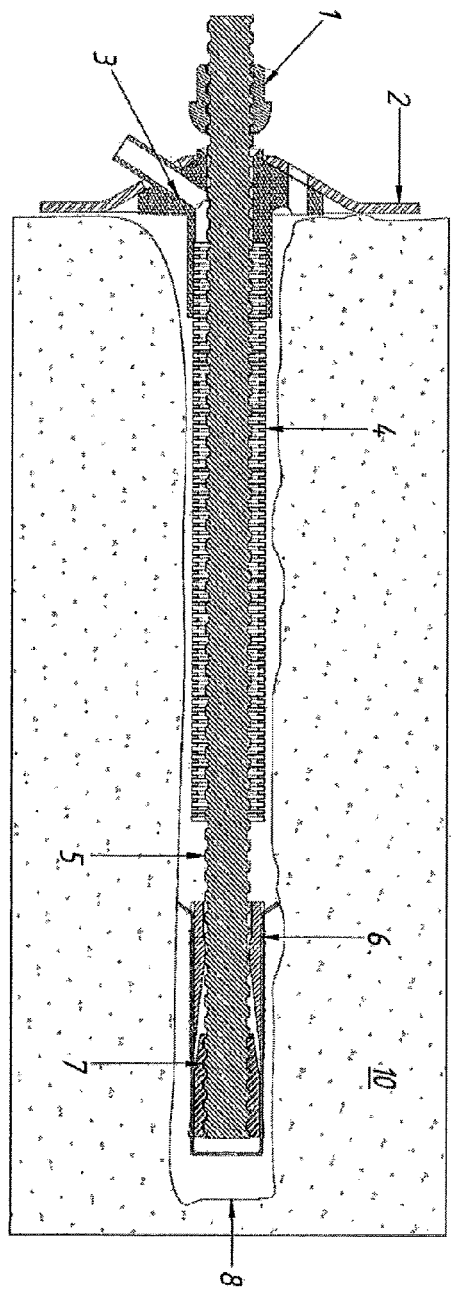
FIG. 1 is a cross-sectional view of the reinforcement system with mechanical anchoring, with a rear injection option, showing its constituent parts and representing interaction with the rock formation.

FIG. 1 shows the components that make up the reinforcement system with mechanical anchoring and rear injection option and the manner in which they interact with the drilled rock formation (10). The reinforcement system of the present invention employs a rod or helical bolt as the main means of anchorage, interacting mechanically with an expansion head (6).

As explained earlier, the system integrates the characteristics of a helical bolt (5) for reinforcement, adding an expansion head (6) (mechanical anchoring) that upon insertion into the rock interacts with the formation (10) and allows load resistance immediately.

To understand the operation of the present invention its components will be described separately.

Figure 2:
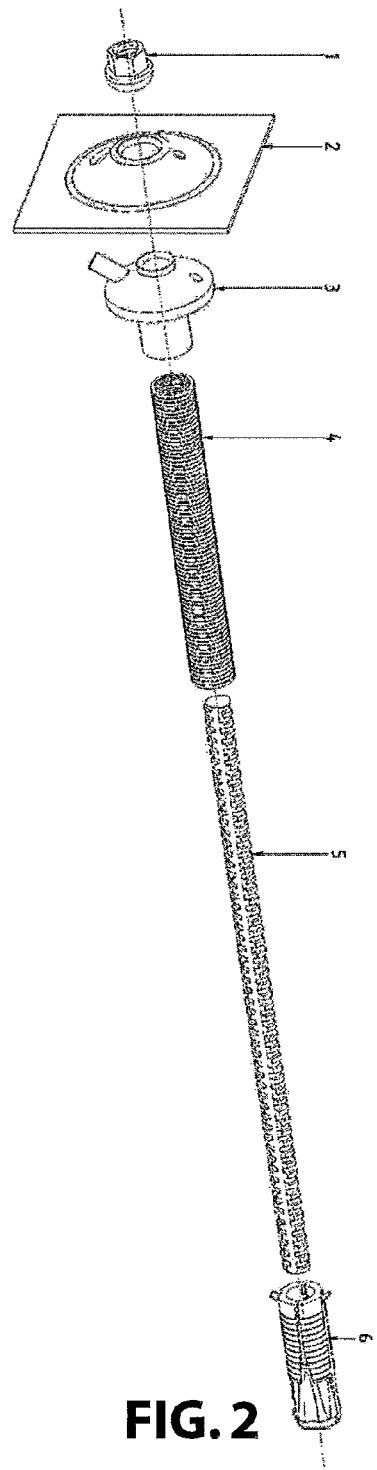
FIG. 2 is an exploded view of the system shown in FIG. 1.

As shown in FIG. 2, helical nut (1) and helical bolt (5) having distal end (7), respectively, are the typical helical rod systems currently in existence, and which are used in strata reinforcement or support tasks. It should be noted that on its own, this system employs chemical anchoring methods (adhesive anchoring). Reference numeral (2) indicates a reinforcement plate. Reference numeral (3) indicates a conical element configured for the subsequent injection of grout to the system. Reference numeral (4) indicates a rough pipe or sheath made of polymer, used to direct the grout flow when it is injected into the system. Its system of projections allows for the adherence between the rock and the bolt via the grout within borehole (8), without any displacement arising from the presence of this intermediate element.

Figure 6:
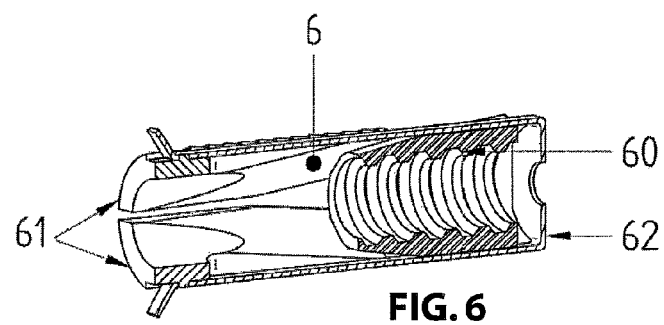
FIG. 6 is a cutaway view showing details of the expansion head, displaying its component parts.

In FIG. 6, shown is a cutaway detail of the expansion head (6) with bail (62) that allows generating mechanical fastening by interference with the rock formation (10) through the casing (61) at the time that the system is pulled by the exposed end (away from the rock). This element is widely known and employed in fastenings, but unlike a common expansion head, the thread on the expansion wedge (60) has been modified and adapted for compatibility with the thread of the helical rod (5) used in the mechanical anchoring with the rear injection reinforcement system of the present invention.

Figure 3:
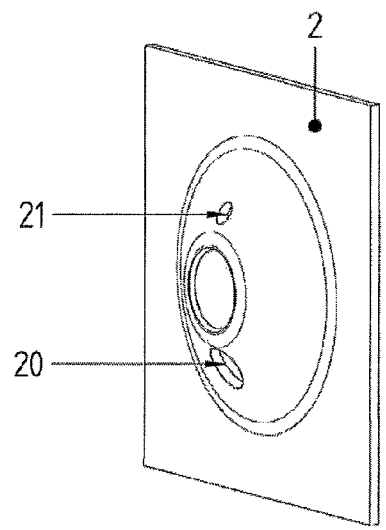
FIG. 3 is a perspective view showing details of the reinforcement plate employed by the reinforcement bolt with mechanical anchoring and rear injection option, previously enumerated in FIG. 1.

In FIG. 3, shown is the reinforcement plate (2) to which a perforation (20) has been added to insert the injection nozzle (31), and another perforation of smaller diameter (21) that is used for venting purposes, and also to show when the system has become full during the injection process.

Figure 4:
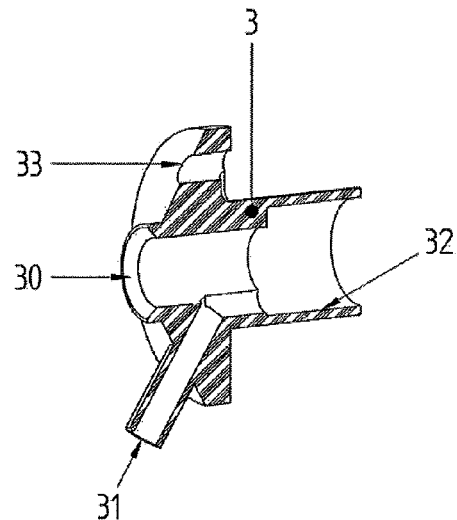
FIG. 4 is a cutaway view showing details of the conical plastic element for injection and fastening of the sheath of protective tube that guides the grout at the moment of injection.

FIG. 4 shows the conical element for injection in detail. It is manufactured out of a plastic material in order to diminish the presence of steel in the hillside or rock formation. The element has a conduit or injection nozzle (31) whose outer diameter is smaller than that of the perforation (20) in the reinforcement plate (2). Furthermore, it features a central bore (30) whose internal diameter matches the diameter of the bolt or helical rod, and its outer diameter is less than the central opening of the reinforcement plate (2) in FIG. 2. It should be noted that the design features beveled machining in the interior diameter. This is to ensure that when the nut (1) receives the necessary work torque, a seal is created within the conical element (3) and the nut (1), avoiding grout spills in this area when making the injection. It also features a third perforation (33) whose function is to vent and subsequently serve as the fill sample in the injection process should it be performed. FIG. 4 further shows an expansion in the central diameter of the rear section (32). This allows for the corrugated plastic tube or sheath (4) to act as a shim, or insert tightly into the area, remaining joined to the conical element (3). The geometry of the conical element (3) has been designed so that its frontal section can shim with the interior contour of the reinforcement plate (2).

Figure 5:
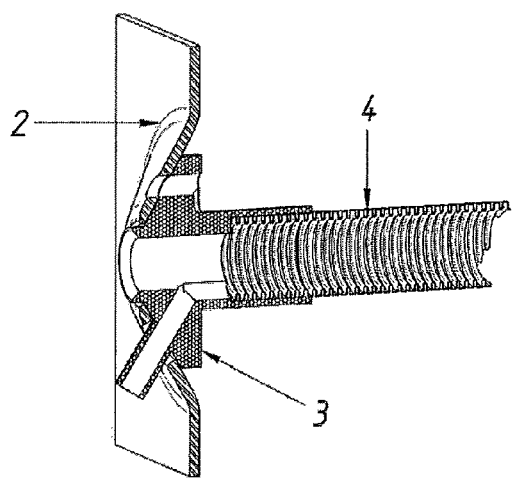
FIG. 5 is a schematic view showing the assembly between the base plate, the injection device and the sheath or protective tube.

FIG. 5 shows the assembly and interaction between the reinforcement plate (2), injection device or conical element (3) and the corrugated plastic tube or sheath (4). It is clearly visible how the perforations described beforehand align to achieve the insertion of the helical rod (5) through the central bore (30), an outlet for the injection nozzle (31) through the perforation (20) in the reinforcement plate (2) and the alignment between the venting and sample perforations, both on the conical element (3) as well as the plate (2).

Although the present invention has been described with reference to specific details of certain embodiments thereof, it is not intended that such details should be regarded as limitations upon the scope of the invention except insofar as they are included in the accompanying claims.

What is claimed is:

1. A reinforcement system comprising:
   a helical rod,
   an expansion head threadable onto the helical rod,
   a conical element comprising plastic,
   a sheath comprising plastic,
   a reinforcement plate having a central opening, and
   a threaded reinforcement nut threadable onto the helical rod and configured to provide immediate mechanical anchoring and the option of subsequent grout injection,
   wherein the conical element comprises a sample perforation for ensuring that the system is completely injected.

2. The reinforcement system of claim 1, wherein the expansion head is attached to a distal end of the helical rod.

3. The reinforcement system of claim 1, wherein an annular gap is provided between the sheath and the helical rod for receiving grout therein.

4. The reinforcement system of claim 1, wherein an exterior of the sheath includes projections.

5. A reinforcement system comprising:
   a helical rod,
   an expansion head threadable onto the helical rod,
   a conical element comprising plastic,
   a sheath comprising plastic,
   a reinforcement plate having a central opening, and
   a threaded reinforcement nut threadable onto the helical rod and configured to provide immediate mechanical anchoring and the option of subsequent grout injection,
   wherein the conical element comprises:
   an injection nozzle that is exposed during assembly and fastening of the reinforcement system,
   a sample perforation for ensuring that the system is completely injected,
   a central bore with a first diameter configured to accept the helical rod and a second diameter into which the sheath is shimmed or inserted, and
   a beveled concentric neck disposed on a side of the conical element.

6. The reinforcement system of claim 5, wherein the beveled concentric neck has a chamfer that generates a seal with the reinforcement nut when the reinforcement nut is tightened, and
   wherein an outer diameter of the beveled concentric neck shims the central opening of the reinforcement plate, and a frontal section of the conical element is adapted to shim with the internal shape of the reinforcement plate.

7. A reinforcement system comprising:
   a helical rod,
   an expansion head threadable onto the helical rod,
   a conical element comprising plastic,
   a sheath comprising plastic,
   a reinforcement plate having a central opening, and
   a threaded reinforcement nut threadable onto the helical rod and configured to provide immediate mechanical anchoring and the option of subsequent grout injection,
   wherein the reinforcement plate defines a first peripheral perforation and a second peripheral perforation,
   wherein the first peripheral perforation is of sufficient size to allow passage of an injection nozzle of the conical element,
   wherein the second peripheral perforation aligns with a sample perforation of the conical element, and
   wherein the central opening of the reinforcement plate is configured to receive at least a portion of the conical element.

\* \* \* \* \*